(12) United States Patent
Asano et al.

(10) Patent No.: US 7,282,248 B2
(45) Date of Patent: Oct. 16, 2007

(54) HEAT INSULATING AND SHIELDING GLASS PANEL

(75) Inventors: Osamu Asano, Nagaokakyo (JP); Terufusa Kunisada, Tsukuba (JP); Tetsuo Minaai, Kyoto (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/289,231

(22) Filed: Nov. 28, 2005

(65) Prior Publication Data

US 2006/0083873 A1   Apr. 20, 2006

Related U.S. Application Data

(63) Continuation of application No. PCT/JP2004/006769, filed on May 13, 2004.

(30) Foreign Application Priority Data

May 29, 2003   (JP) .............................. 2003-152864

(51) Int. Cl.
*E06B 3/00* (2006.01)
*B32B 19/00* (2006.01)
*E04C 2/54* (2006.01)

(52) U.S. Cl. .................. 428/34; 428/701; 428/702; 52/786.13

(58) Field of Classification Search .............. 428/34, 428/699, 701, 702; 52/786.1, 786.13
See application file for complete search history.

(56) References Cited

U.S. PATENT DOCUMENTS 6,306,525 B1 * 10/2001 Schicht et al. .............. 428/633
6,497,931 B1 * 12/2002 Aggas ........................ 428/34

FOREIGN PATENT DOCUMENTS

JP   63-030212   2/1988

(Continued)

*Primary Examiner*—Donald J. Loney
(74) *Attorney, Agent, or Firm*—Cohen Pontani Lieberman & Pavane LLP

(57) ABSTRACT

A heat insulating and shielding glass panel that is capable of maintaining heat shielding performance even if heat treatment is carried out during manufacture. The heat insulating and shielding glass panel 1 is comprised of a pair of glass plates 11 and 12 that are hermetically joined together at their outer peripheral edges via a sealing frame 13 that fluidizes at low temperature, such that respective one surfaces of the glass plates 11, 12 face each other and a hollow layer 14 is formed between the glass plates; and pillars 15 that are substantially cylindrical spacers that are inserted into the hollow layer 14 as atmospheric pressure supporting members and determine the gap between the glass plates 11 and 12. A low-emission transparent multilayer 17 having an emittance of not more than 0.1 is coated by sputtering on each of surfaces 11a and 12a of the respective glass plates 11 and 12 facing the hollow layer 14 so as to realize high heat insulation performance. The low-emission transparent multilayer 17 is comprised of ZnO layers 33 and 35 as dielectric layers separated from each other in the direction of film thickness by an SiNx layer 34 as an amorphous layer, and an Ag—Pd layer 32 as a metal layer containing Ag and Pd.

21 Claims, 12 Drawing Sheets

FOREIGN PATENT DOCUMENTS

| | | |
|---|---|---|
| JP | 63-134232 | 6/1988 |
| JP | 63-239044 | 10/1988 |
| JP | 8-104547 | 4/1996 |
| JP | 09-071441 | 3/1997 |
| JP | 10-236848 | 9/1998 |
| JP | 2882728 | 2/1999 |
| JP | 11-268932 | 10/1999 |
| JP | 2000-302486 | 10/2000 |
| JP | 2002-173343 | 6/2002 |
| JP | 2002-211956 | 7/2002 |
| JP | 2003-104758 | 4/2003 |

* cited by examiner

HEAT INSULATING AND SHIELDING GLASS PANEL

This application is a U.S. Continuation Application under 35 USC 371 of International Application PCT/JP2004/006769 filed 13 May 2004.

TECHNICAL FIELD

The present invention relates to a heat insulating and shielding glass panel that is used for a window glass of a building or the like and has the optimum heat insulation performance and heat shield performance.

BACKGROUND ART

In recent years, glass panels having not only heat insulation performance but also heat shield performance have been developed. For example, there has been used a glass panel that is comprised of a colored heat-ray absorbing glass, a clear glass disposed in opposed relation to the heat-ray absorbing glass via spacers so as to form a hollow layer therebetween, and a low-emission transparent multilayer formed on an inner glass surface of the colored heat-ray absorbing glass, wherein the colored heat-ray absorbing glass is disposed on the outdoor side and the clear glass is disposed on the indoor side (see Japanese Patent Publication No. 2882728, for example).

As a low-emission transparent multilayer formed on a hollow-layer-side glass surface of a colored heat-ray absorbing glass disposed on the outdoor side, there has been disclosed a multilayer that provides a mechanism having solar radiation heat shield performance and high heat insulation performance (see Japanese Laid-Open Patent Publication (Kokai) Nos. S63-30212, S63-134232, and S63-239044, for example).

This low-emission transparent multilayer is constructed by stacking a total of (2n+1) layers including dielectric layers and metal layers on a glass surface and by forming a protective layer as the uppermost layer of the multilayer. It is known that as the dielectric layers, ZnO is excellent in film formation speed, and also, as the metal layers, Ag is excellent in heat-ray reflecting function.

Further, SiNx, $TiO_2$, SiAlOxNy (sialon), or the like is known as the protective layer.

The above described low-emission transparent multilayer has the problem that the metal layers are corroded by migration thereof caused by the presence of moisture, oxygen, chlorine, and so on in the air. On the basis of this problem, the applicant of the present invention has previously obtained the knowledge that the above mentioned moisture and others present in the air pass through metal oxide layers (dielectric layers) formed on the metal layers to reach the metal layers. In order to prevent the corrosion to thereby improve the durability of the multilayer, the applicant has proposed to set the average crystal grain size of crystal grains constituting the metal oxide layers to 20 nm or less so as to make the metal oxide layers dense and prevent transmission of moisture through the metal oxide layers (see Japanese Laid-Open Patent Publication (Kokai) No. H09-71441, for example).

Further, the applicant of the present invention has previously proposed a low-emission transparent multilayer in which dielectric layers are separated from each other by an amorphous layer, and metal layers (Ag) have improved durability (see Japanese Laid-Open Patent Publication (Kokai) No. 2002-173343, for example).

However, in the case where the above-mentioned low-emission transparent multilayer is formed on a glass surface on a hollow layer side, the low-emission transparent multilayer is brought into a smoking or smoldering state by heat treatment carried out during manufacture of the concerned glass panel, and migration of the metal layer (Ag) in the low-emission transparent multilayer occurs to corrode the metal layer (Ag) and degrade heat shield performance.

The present invention has been developed in view of the above described problems. It is an object of the present invention to provide a heat insulating and shielding glass panel that is capable of maintaining heat shield performance even if the glass panel is subjected to heat treatment during manufacture.

DISCLOSURE OF THE INVENTION

To attain the above object, according to the present invention, there is provided a heat insulating and shielding glass panel comprising a pair of glass plates provided separated from each other via pillars by a predetermined gap so as to form a hollow layer therebetween, and an outer peripheral sealing portion that hermetically seals the hollow layer at a peripheral portion of the pair of glass plates, wherein a low-emission transparent multilayer comprising dielectric layers and metal layers is formed on a glass plate surface facing the hollow layer, the dielectric layers are separated from each another in a direction of film thickness by at least one amorphous layer, and the metal layers contain Ag and Pd.

In the present invention, it is preferred that the low-emission transparent multilayer comprises an $SiO_2$ layer as an uppermost layer in contact with the hollow layer and the outer peripheral sealing portion.

In the present invention, it is preferred that the low-emission transparent multilayer comprises an $SiO_2$ layer as a lowermost layer in contact with the glass plate surface.

In the present invention, it is preferred that the dielectric layers separated from each other by the amorphous layer comprise oxide layers containing at least one kind of metal selected from a group of Zn, Sn, Ti, In, and Bi.

In the present invention, it is preferred that the dielectric layers separated from each other by the amorphous layer comprise zinc oxide as a principal component thereof.

In the present invention, it is preferred that at least one of the dielectric layers separated from each other by the amorphous layer is located on an opposite side of the glass plate relative to the metal layer closest to the glass plate.

In the present invention, it is preferred that the metal layers comprise one metal layer, and the dielectric layers separated from each other by the amorphous layer are located on an opposite side of the glass plate relative to the metal layer.

In the present invention, it is preferred that the metal layers comprise not less than two metal layers, and at least one of the dielectric layers separated from each other by the amorphous layer is located on a side close to the glass plate relative to the metal layer farthest from the glass plate.

In the present invention, it is preferred that the amorphous layer comprises at least one selected from a group of a nitride, an oxynitride, and an amorphous oxide.

In the present invention, it is preferred that the nitride layer comprises a nitride containing at least one kind of metal selected from a group of Si, Al, Ti, and Sn.

In the present invention, it is preferred that the oxynitride layer comprises an oxynitride containing at least one kind of metal selected from a group of Si, Al, Ti, and Sn.

In the present invention, it is preferred that the amorphous oxide layer comprises an amorphous oxide containing at least one kind of metal selected from a group of Si, Al, Ti, and Sn.

In the present invention, it is preferred that an uppermost layer of the low-emission transparent multilayer, the uppermost layer being in contact with the hollow layer and the outer peripheral sealing portion, is implemented by a protective layer comprising a nitride, an oxynitride, or an amorphous oxide containing at least one kind of metal selected from a group of Si, Al, Ti, and Sn.

In the present invention, it is preferred that the amorphous layer has a film thickness of not less than 3 nm and not more than 30 nm.

In the present invention, it is preferred that the amorphous layer has a film thickness of not less than 5 nm and not more than 20 nm.

In the present invention, it is preferred that at least one of the at least one amorphous layer comprises silicon nitride.

In the present invention, it is preferred that all the dielectric layers have zinc oxide as a principal component thereof.

In the present invention, it is preferred that the low-emission transparent multilayer comprises a plurality of the dielectric layers, the plurality of dielectric layers having the metal layers formed therebetween, and a sacrifice layer that prevents degradation of the metal layer during formation thereof is inserted into an interface farther from the glass plate among interfaces between the metal layers and the dielectric layers.

In the present invention, it is preferred that the sacrifice layer comprises an oxide containing Ti.

In the present invention, it is preferred that the sacrifice layer comprises an oxide containing Nb.

In the present invention, it is preferred that the metal layers have Ag as a principal component thereof.

In the present invention, it is preferred that the low-emission transparent multilayer is configured such that an integral width $\beta i$ of a peak whose maximum lies at $32° \leq 2\theta$ (angle of diffraction) $\leq 35°$ among X-ray diffraction peaks obtained using a CuK$\alpha$ ray is not less than 0.43 and not more than 1.20.

In the present invention, it is preferred that the integral width $\beta i$ is not less than 0.50 and not more than 1.20.

In the present invention, it is preferred that the peak whose maximum lies at $32° \leq 2\theta$ (angle of diffraction) $\leq 35°$ is a peak based on a (002) diffraction ray of zinc oxide.

In the present invention, it is preferred that the low-emission transparent multilayer comprises a first dielectric layer that is an oxide layer containing Zn and is formed on the glass plate surface, a metal layer that contains Ag and Pd and is formed on the first dielectric layer, a sacrifice layer that comprises oxide containing Nb and is formed on the metal layer, a second dielectric layer that is an oxide layer containing Zn and is formed on the sacrifice layer, a first amorphous layer that comprises silicon nitride and is formed on the second dielectric layer, a third dielectric layer that is an oxide layer containing Zn and is formed on the first amorphous layer, a second amorphous layer that comprises silicon nitride and is formed on the third dielectric layer, a fourth dielectric layer that is an oxide layer containing Zn and is formed on the second amorphous layer, and a third amorphous layer that comprises silicon nitride and is formed on the fourth dielectric layer.

In the present invention, it is preferred that the first dielectric layer, the metal layer, the sacrifice layer, the second dielectric layer, the first amorphous layer, the third dielectric layer, the second amorphous layer, the fourth dielectric layer, and the third amorphous layer have film thicknesses of 25 to 30 nm, 10 to 20 nm, 1 to 10 nm, 1 to 20 nm, 1 to 20 nm, 1 to 20 nm, 1 to 20 nm, 1 to 20 nm, and 1 to 20 nm, respectively.

In the present invention, it is preferred that the low-emission transparent multilayer comprises an $SiO_2$ layer as an uppermost layer in contact with the hollow layer and the outer peripheral sealing portion.

In the present invention, it is preferred that the low-emission transparent multilayer comprises an $SiO_2$ layer as a lowermost layer in contact with the glass plate surface.

BEST MODE FOR CARRYING OUT THE INVENTION

Embodiments of the present invention will now be described with reference to the drawings.

Figure 1:
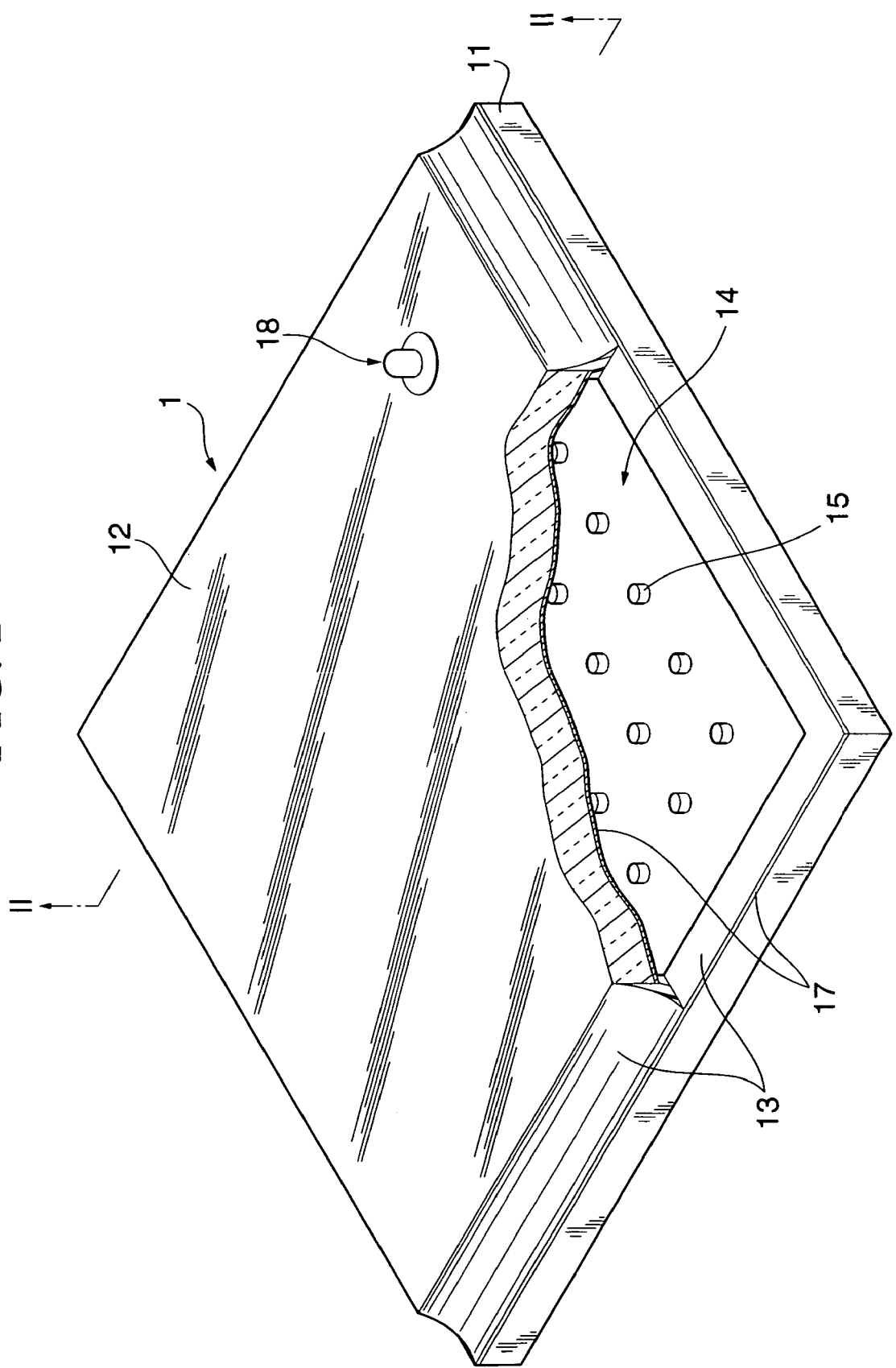
FIG. 1 is a perspective view showing a heat insulating and shielding glass panel according to an embodiment of the present invention.

FIG. 1 is a perspective view of a heat insulating and shielding glass panel according to an embodiment of the present invention.

In FIG. 1, the heat insulating and shielding glass panel 1 is comprised of a pair of glass plates 11 and 12 that are hermetically joined together at their outer peripheral edges via a sealing frame 13 that fluidizes at low temperature, such that respective one surfaces of the glass plates 11, 12 face each other and a hollow layer 14 is formed between the glass plates; and pillars 15 that are substantially cylindrical spacers that are inserted into the hollow layer 14 as atmospheric pressure supporting members and determine the gap between the glass plate 11 and the glass plate 12.

Figure 2:
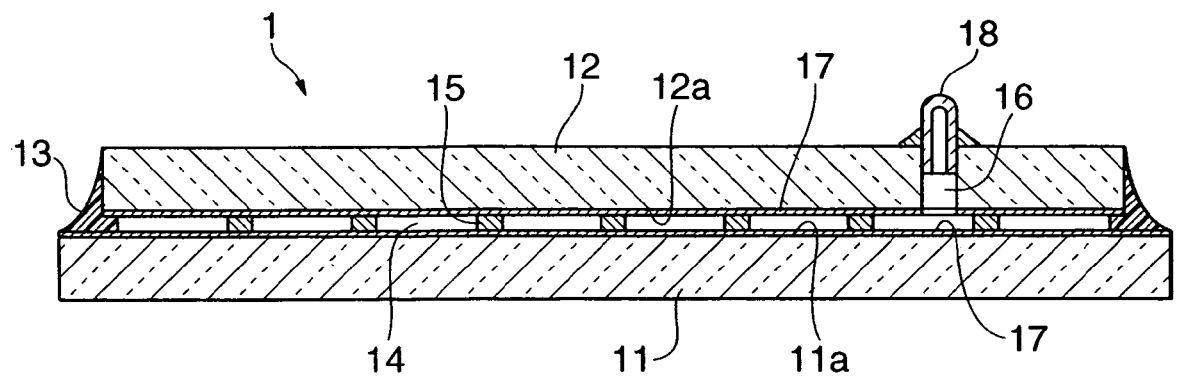
FIG. 2 is a sectional view taken along line II-II in FIG. 1.

FIG. 2 is a sectional view taken along line II-II in FIG. 1.

In FIG. 2, the glass plates 11 and 12 are each made of float plate glass, and each have a thickness set as appropriate between 2 and 10 mm, preferably between 2.5 and 8 mm. The glass plate 12 has formed therein a through hole 16 in a freely chosen position inside of a sealing surface with the sealing frame 13, so that the inside of the hollow layer 14 can be put into a reduced pressure state. A glass tube 18 is set in the through hole 16, and sites of contact therebetween are sealed using a predetermined method. Moreover, an end of the glass tube 18 on the atmospheric side is sealed using a predetermined method.

A low-emission transparent multilayer 17 having an emittance of not more than 0.1 is coated by sputtering to obtain high heat insulation performance on each of an inner surface 11a of the glass plate 11 and an inner surface 12a of the glass plate 12 that define the hollow layer 14.

A description will now be given of a method of manufacturing the heat insulating and shielding glass panel 1 in FIG. 1.

First, a sheet of float plate glass having a predetermined thickness is prepared, and then the sheet of float plate glass is cut to a predetermined size, thus manufacturing a glass plate 11, and a glass plate 12 that is cut smaller by predetermined dimensions than the glass plate 11. A through hole 16 is then formed in the glass plate 12.

Next, the low-emission transparent multilayer 17 is coated by sputtering on each of the surface 11a of the glass plate 11 and the surface 12a of the glass plate 12. Such a low-emission transparent multilayer 17 may alternatively be coated on only one of the glass plates 11 and 12. The glass plate 11 is then disposed horizontally such that the low-emission transparent multilayer 17 is on top, and the pillars 15 are arranged with a predetermined spacing in a horizontal direction on the glass plate 11. The glass plate 12 is then gently placed on the glass plate 11 with the pillars 15 therebetween such that the surface 12a contacts the pillar contact surface of each pillar 15. After that, it is preferred that a weight is placed on the glass plate 12 so that the pillars 15 will not move during a step of forming the sealing frame 13.

With the weight placed on the glass plates 11 and 12 that have been placed together as described above, the sealing frame 13 made of a paste-like low-melting glass material is coated onto the glass plate 12 along an outer peripheral edge thereof to obtain a glass assembly. At this time, since the low-emission transparent multilayer 17 is coated on each of the surfaces 11a and 12a, the low-emission transparent multilayer 17 contacts the sealing frame 13 at an outer peripheral edge of each of the glass plates 11 and 12. The whole of the obtained glass assembly is then heated to 500° C. in a furnace to melt the low-melting glass material constituting the sealing frame 13. The temperature inside the furnace is then reduced down to approximately room temperature at a temperature reduction speed of 1 to 20° C./min to cool the glass assembly, and a space between outer peripheries of the glass plates 11 and 12 is sealed by the hardened sealing frame 13 to form the hollow layer 14. At the same time as sealing the glass plates 11 and 12, the glass tube 18 is set into the prefabricated through hole 16 in the glass plate 12 to seal sites of contact therebetween.

After the cooling has been completed, a vacuum pump (not shown in the drawings) is attached to the glass tube 18 via a vacuum pump attachment jig (not shown in the drawings), and the hollow layer 14 is evacuated using the vacuum pump while heating the whole of the glass plates 11 and 12 to 150° C., thus reducing the pressure inside the hollow layer 14 down to approximately 10 to 0.01 Pa, and then the glass tube is sealed up, thus completing the manufacture of the heat insulating and shielding glass panel 1.

In the embodiment of the present invention, the through hole 16 and the glass tube 18 are provided in the glass plate 12, and the hollow layer 14 is put into a reduced pressure state by evacuating through the glass tube 18 using the vacuum pump, but the method of putting the hollow layer 14 into a reduced pressure state is not limited to this; for example, instead of forming the through hole 16 and the glass tube 18 in the glass plate 12, the hollow layer 14 may be put into a reduced pressure state by sealing a space between outer peripheries of the glass plates 11 and 12 with the sealing frame 13 under a vacuum environment.

Also, although in the embodiment of the present invention, the glass plate 12 is placed on the glass plate 11 on which the pillars 15 are disposed, and the sealing frame 13 is then formed, there is no limitation thereto, but the glass plate 12 may be placed over the glass plate 11 on which the sealing frame 13 and the pillars 15 are disposed.

Also, although in the embodiment of the present invention, the whole of the glass assembly having the sealing frame 13 constituted by the low-melting glass material is heated to 500° C. in the furnace to melt the low-melting glass material constituting the sealing frame 13, and the temperature inside the furnace is reduced down to approximately room temperature at a temperature reduction speed of 1 to 20° C./min to cool the glass assembly, there is no limitation thereto, but after the sealing frame 13 is heated to not less than 480° C. to join the glass plates 11 and 12 together, a baking process in which gas inside the hollow layer 14 heated to not less than 400° C. is removed by suction from the glass tube 18 while the viscosity of the low-melting glass material is kept in a softened state of not more than $10^{10}$ pascals per second (Pa·s) with the hollow layer 14 being heated may be carried out before the viscosity of the low-melting glass material constituting the sealing frame 13 exceeds $10^{10}$ pascals per second (Pa·s) due to a change in the temperature of the low-melting glass material.

Also, although in the embodiment of the present invention, the low-melting glass is used as a material of the sealing frame 13, there is no limitation thereto, but for example, a metallic solder having as a principal component thereof indium, lead, tin, zinc, or the like may be used as a material of the sealing frame 13. In this case, while heating the glass plates 11 and 12 to 200° C., a gap at a periphery of the glass plates 11 and 12 is sealed with metal solder poured into the gap using an ultrasonic soldering iron (not shown in the drawings). Once the sealing of the periphery has been completed, cooling is then carried out at a slow rate of approximately 1° C./min to form the sealing frame 13.

Figure 3:
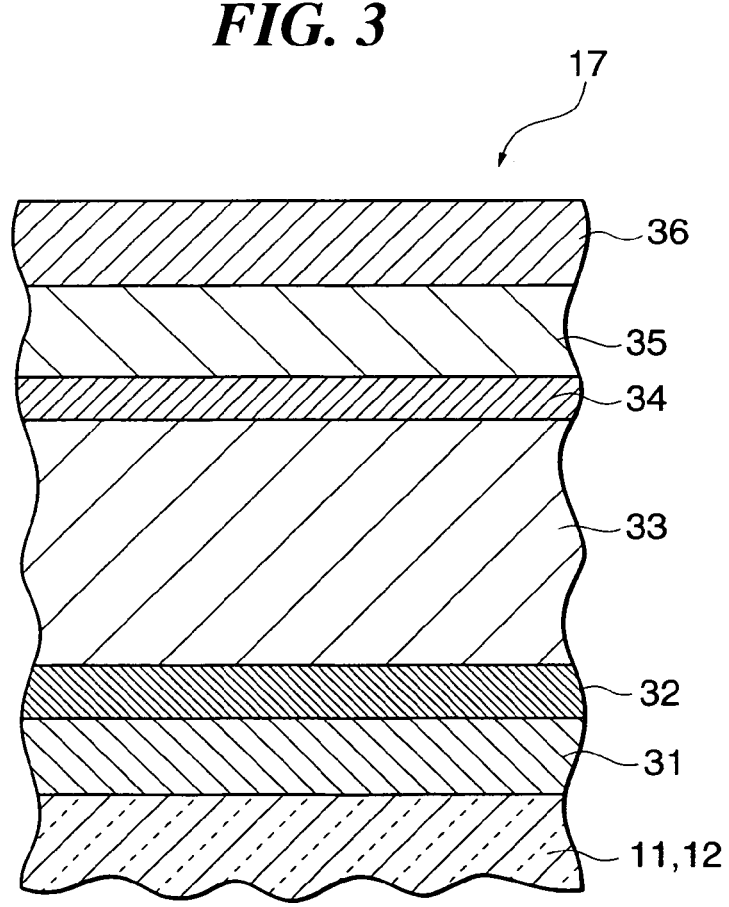
FIG. 3 is a sectional view showing a low-emission transparent multilayer appearing in FIG. 1.

FIG. 3 is a sectional view showing the low-emission transparent multilayer 17 appearing in FIG. 1.

In FIG. 3, the low-emission transparent multilayer 17 is comprised of a ZnO layer 31 as a dielectric layer that is formed on each of the glass plates 11 and 12 as transparent bases and yields a high degree of orientation of crystals, an Ag layer (Ag—Pd layer) 32 containing Pd as a metal layer formed on the ZnO layer 31, a ZnO layer 33 as a dielectric layer that is formed on the Ag—Pd layer 32 and yields a high degree of orientation of crystals, an SiNx layer 34 as an amorphous layer that is formed on the ZnO layer 33, a ZnO layer 35 as a dielectric layer that is formed on the SiNx layer 34 and yields a low degree of orientation of crystals, and an SiNx layer 36 as a protective layer that is formed on the ZnO layer 35 and has a protective function.

With the above construction, the ZnO layers 33 and 35 as dielectric layers are separated from each other in the direction of film thickness by the SiNx layer 34 as an amorphous layer. The Ag—Pd layer 32 as a metal layer contains Ag and Pd.

Figure 4:
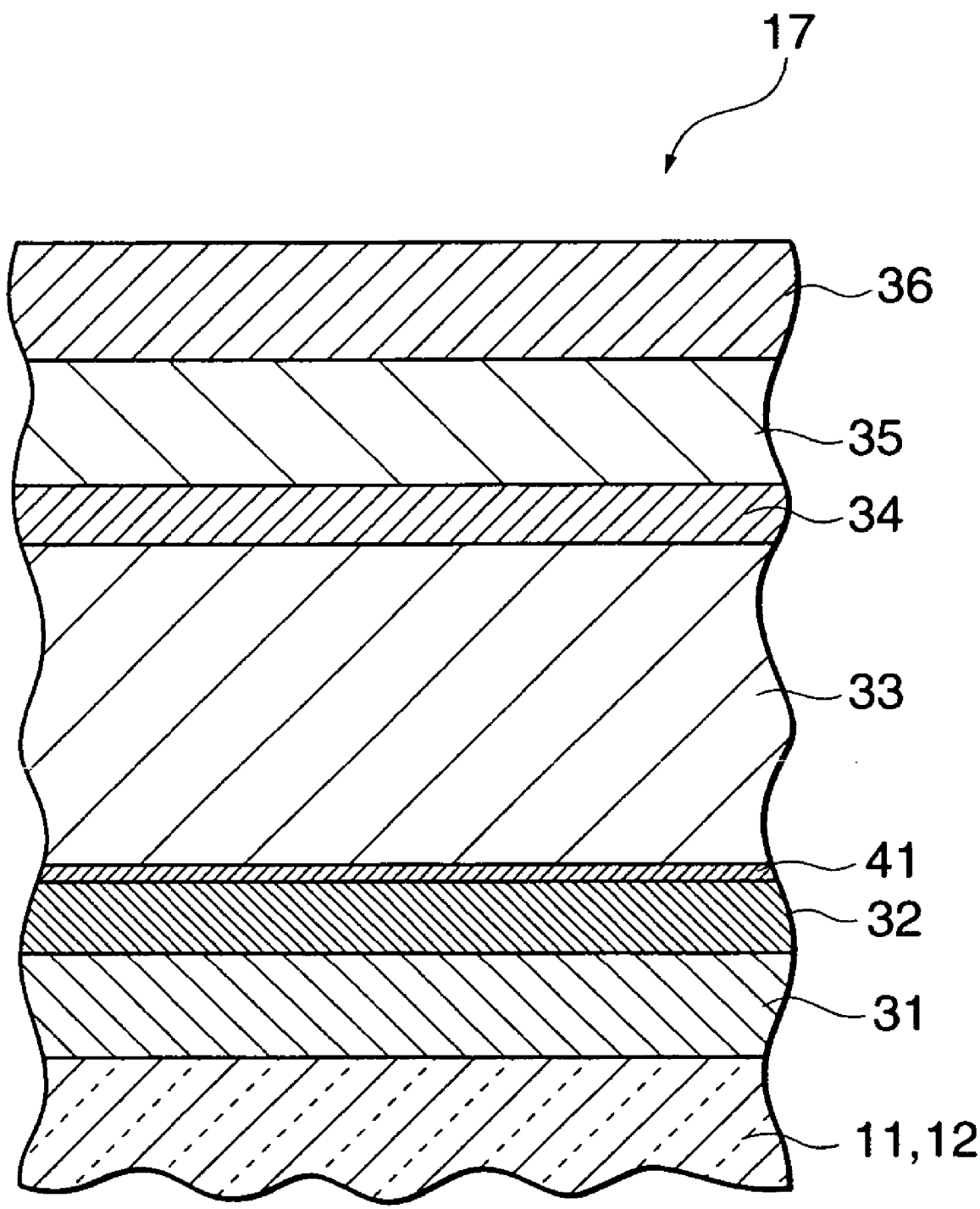
FIG. 4 is a sectional view showing a first variation of the low-emission transparent multilayer in FIG. 3.

FIG. 4 is a sectional view showing a first variation of the low-emission transparent multilayer appearing in FIG. 3.

In FIG. 4, the low-emission transparent multilayer 17 is basically identical in construction with the low-emission transparent multilayer 17 in FIG. 3, but differs in that there is further provided a TiOx layer 41 as a sacrifice layer formed on the Ag—Pd layer 32 as a metal layer. The TiOx layer 41 acts in an effective manner particularly in the case where the ZnO layer 33 is formed by reactive sputtering. That is, if the ZnO layer 33 is directly formed on the Ag—Pd layer 32, Ag in the Ag—Pd layer 32 is prone to bind to oxygen during sputtering and deteriorate. Therefore, Ti is formed on the Ag—Pd layer 32. The Ti then binds to oxygen produced during sputtering to become TiOx and prevents Ag from binding to oxygen.

Figure 5:
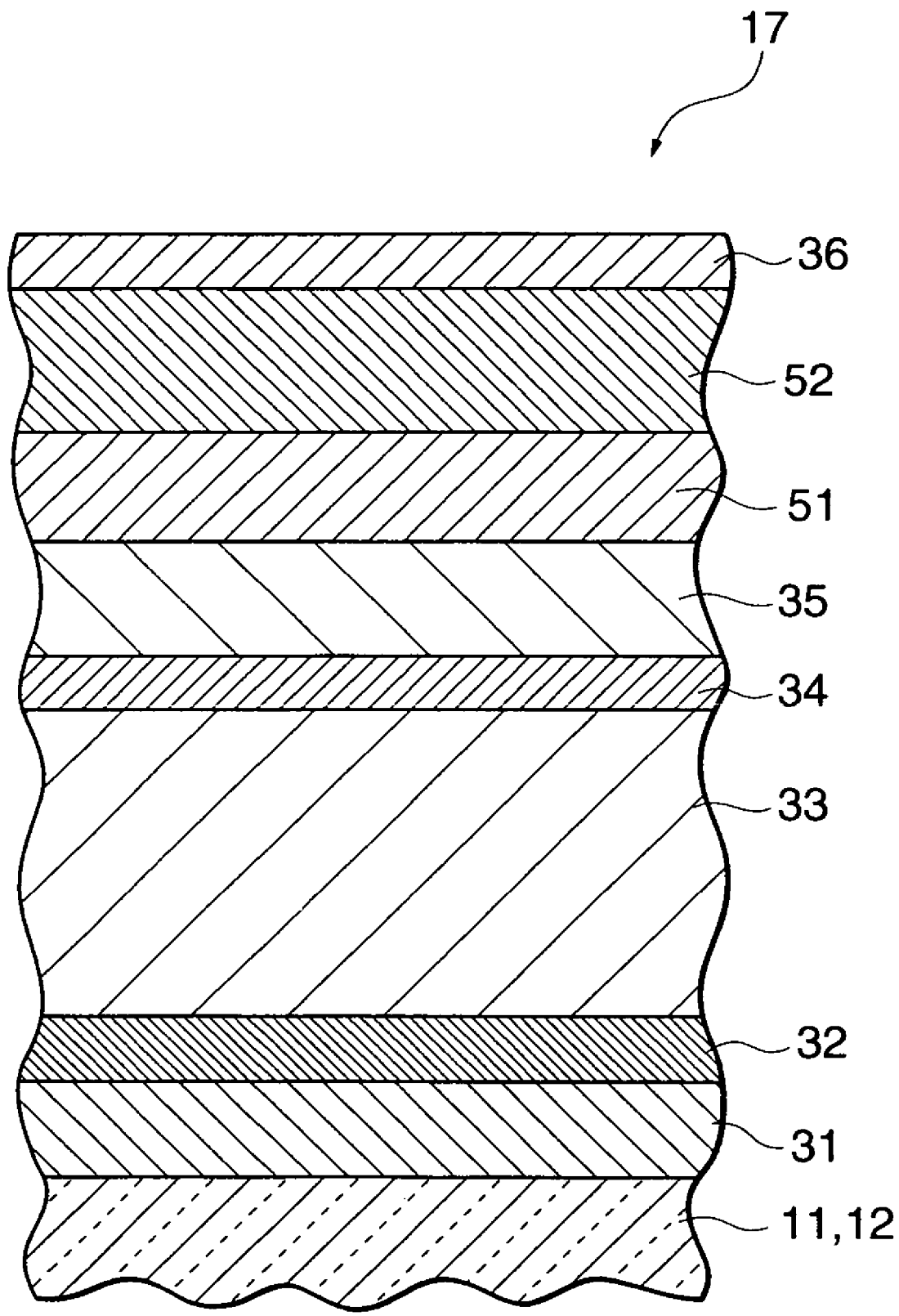
FIG. 5 is a sectional view showing a second variation of the low-emission transparent multilayer in FIG. 3.

FIG. 5 is a sectional view showing a second variation of the low-emission transparent multilayer in FIG. 3.

In FIG. 5, the low-emission transparent multilayer 17 is basically identical in construction with the low-emission transparent multilayer 17 in FIG. 3, but differs in that there are further provided a SiNx layer 51 as an amorphous-layer formed on the ZnO layer 35 as a dielectric layer, and a ZnO layer 52 as a dielectric layer that is formed on the SiNx layer 51 and yields a low degree of orientation of crystals.

Figure 6:
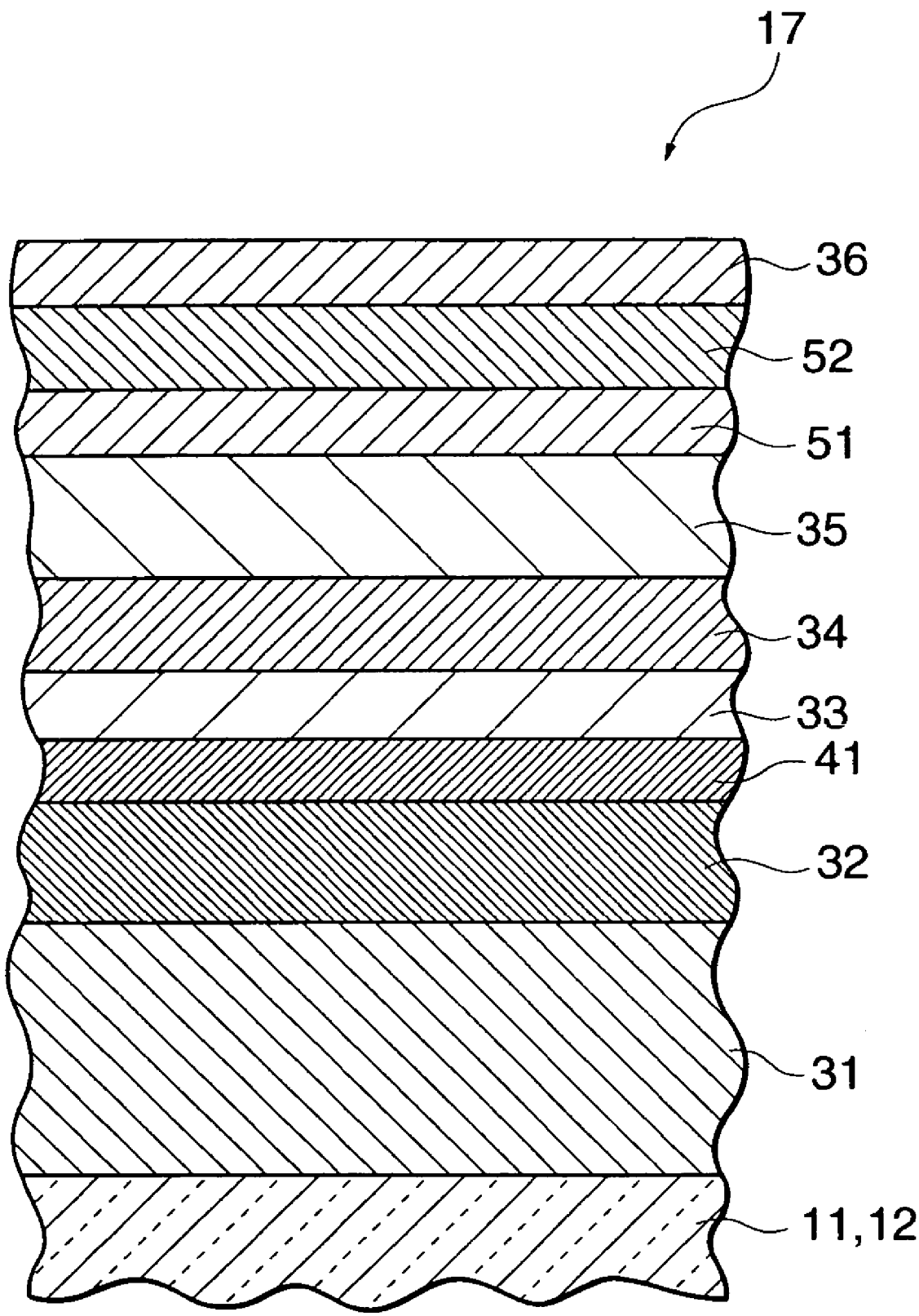
FIG. 6 is a sectional view showing a variation of the low-emission transparent multilayer in FIG. 5.

FIG. 6 is a sectional view showing a variation of the low-emission transparent multilayer appearing in FIG. 5.

In FIG. 6, the low-emission transparent multilayer 17 is basically identical in construction with the low-emission transparent multilayer 17 in FIG. 5, but differs in that there is further provided a TiOx layer 41 as a sacrifice layer formed on the Ag—Pd layer 32.

Figure 7:
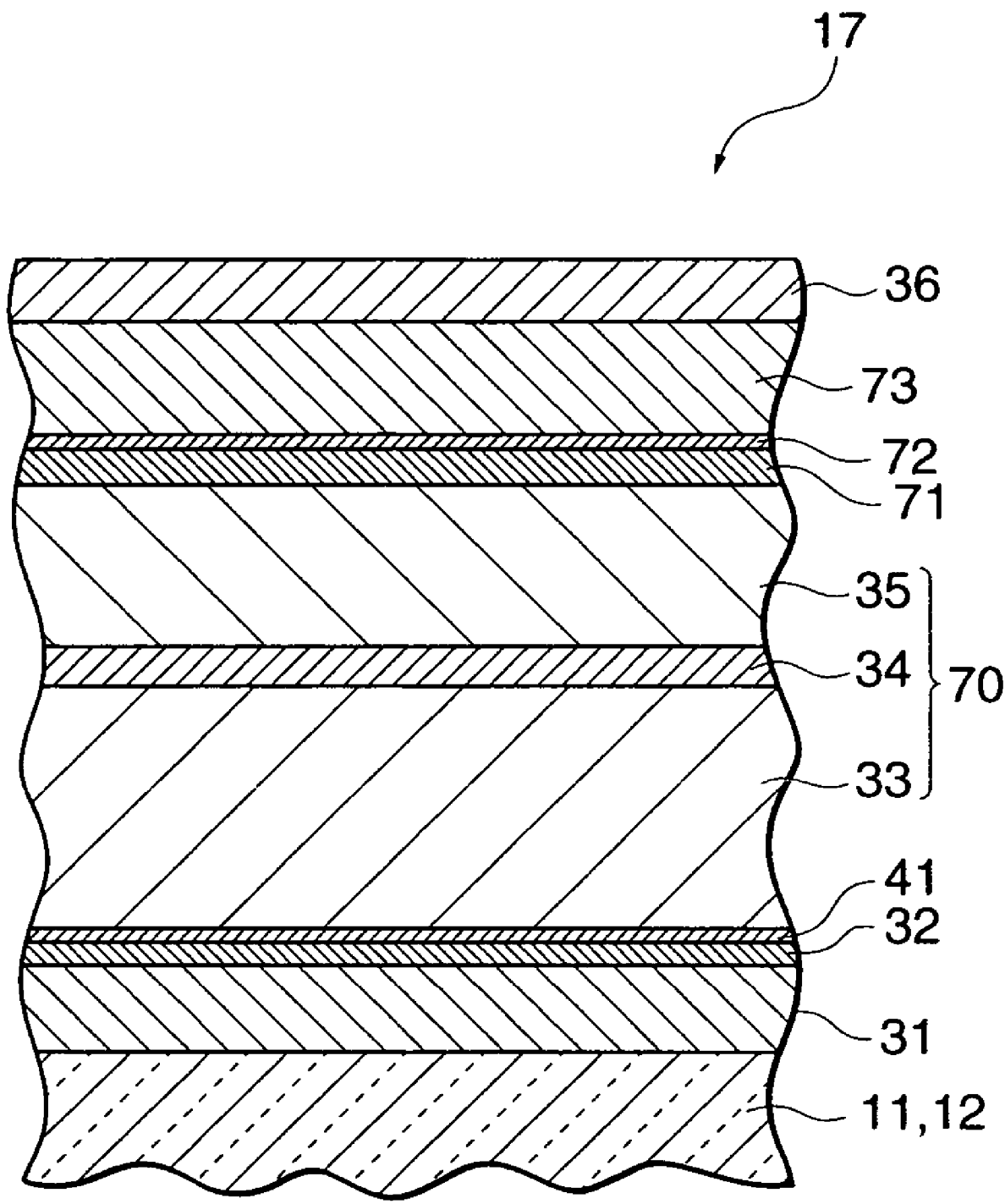
FIG. 7 is a sectional view showing a third variation of the low-emission transparent multilayer in FIG. 3.

FIG. 7 is a sectional view showing a third variation of the low-emission transparent multilayer appearing in FIG. 3.

In FIG. 7, the low-emission transparent multilayer 17 is comprised of a ZnO layer 31 as a dielectric layer that is formed on each of the glass plates 11 and 12 as transparent bases and yields a high degree of orientation of crystals, Ag—Pd layers 32 and 71 as double metal layers, TiOx layers 41 and 72 as sacrifice layers formed on the respective Ag—Pd layers 32 and 71, a dielectric 70 formed on the TiOx layer 41 that is on the inner side (the side close to the glass plates 11 and 12), a ZnO layer 73 as a dielectric layer formed on the TiOx layer 72 that is on the outer side (the side far from the glass plates 11 and 12), and an SiNx layer 36 as a protective layer that is formed on the ZnO layer 73 and has a protective function.

The dielectric 70 is comprised of three layers: a ZnO layer 33 as a dielectric layer that is formed on the inner Ag—Pd layer 32 side and yields a high degree of orientation of crystals, an SiNx layer 34 as an amorphous layer formed on the ZnO layer 33, and a ZnO layer 35 that is formed on the SiNx layer 34 and yields a low degree of orientation of crystals.

Figure 8:
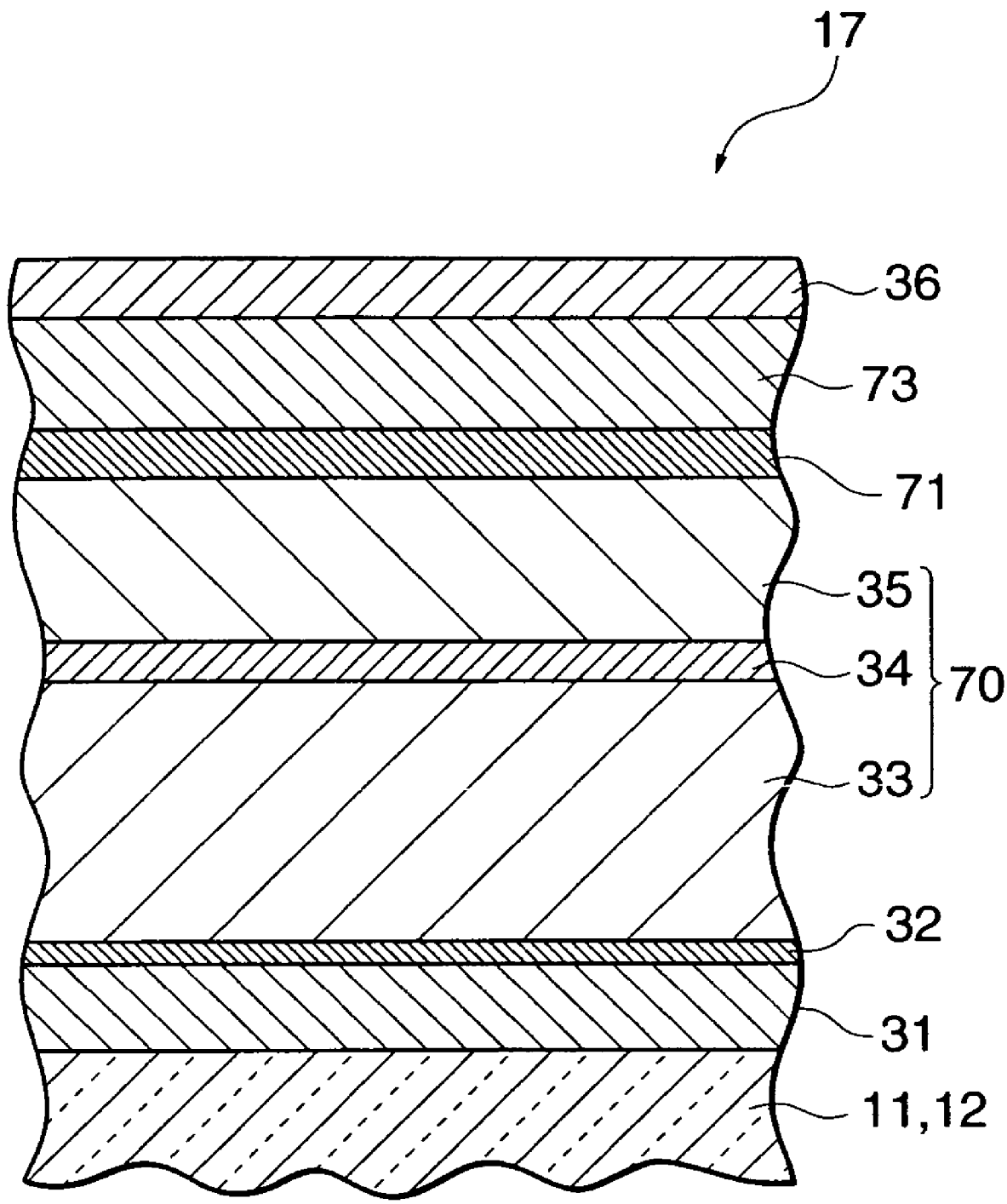
FIG. 8 is a sectional view showing a variation of the low-emission transparent multilayer in FIG. 7.

FIG. 8 is a sectional view showing a variation of the low-emission transparent multilayer in FIG. 7.

In FIG. 8, the low-emission transparent multilayer 17 is basically identical in construction with the low-emission transparent multilayer 17 in FIG. 7, but differs in that the TiOx layers 41 and 72 as sacrifice layers are not formed on the respective Ag—Pd layers 32 and 71.

Figure 9:
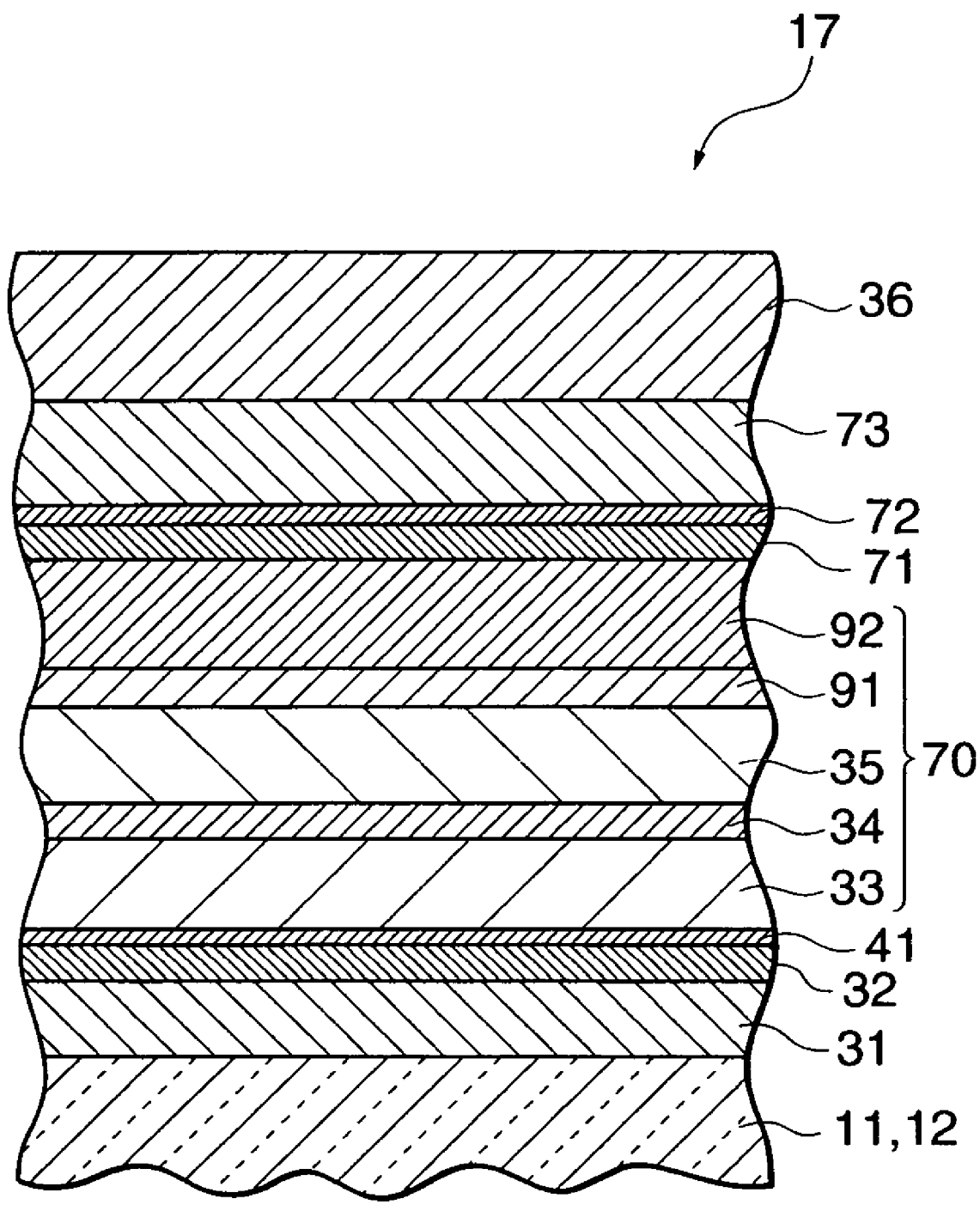
FIG. 9 is a sectional view showing a second variation of the low-emission transparent multilayer in FIG. 7.

FIG. 9 is a sectional view showing a second variation of the low-emission transparent multilayer in FIG. 7.

In FIG. 9, the low-emission transparent multilayer 17 is basically identical in construction with the low-emission transparent multilayer 17 in FIG. 7, but differs in that the dielectric 70 is further comprised of an SiNx layer 91 as an amorphous layer formed on the ZnO layer 35, and a ZnO layer 92 as a dielectric layer that is formed on the SiNx layer 91 and yields a low degree of orientation of crystals.

Figure 10:
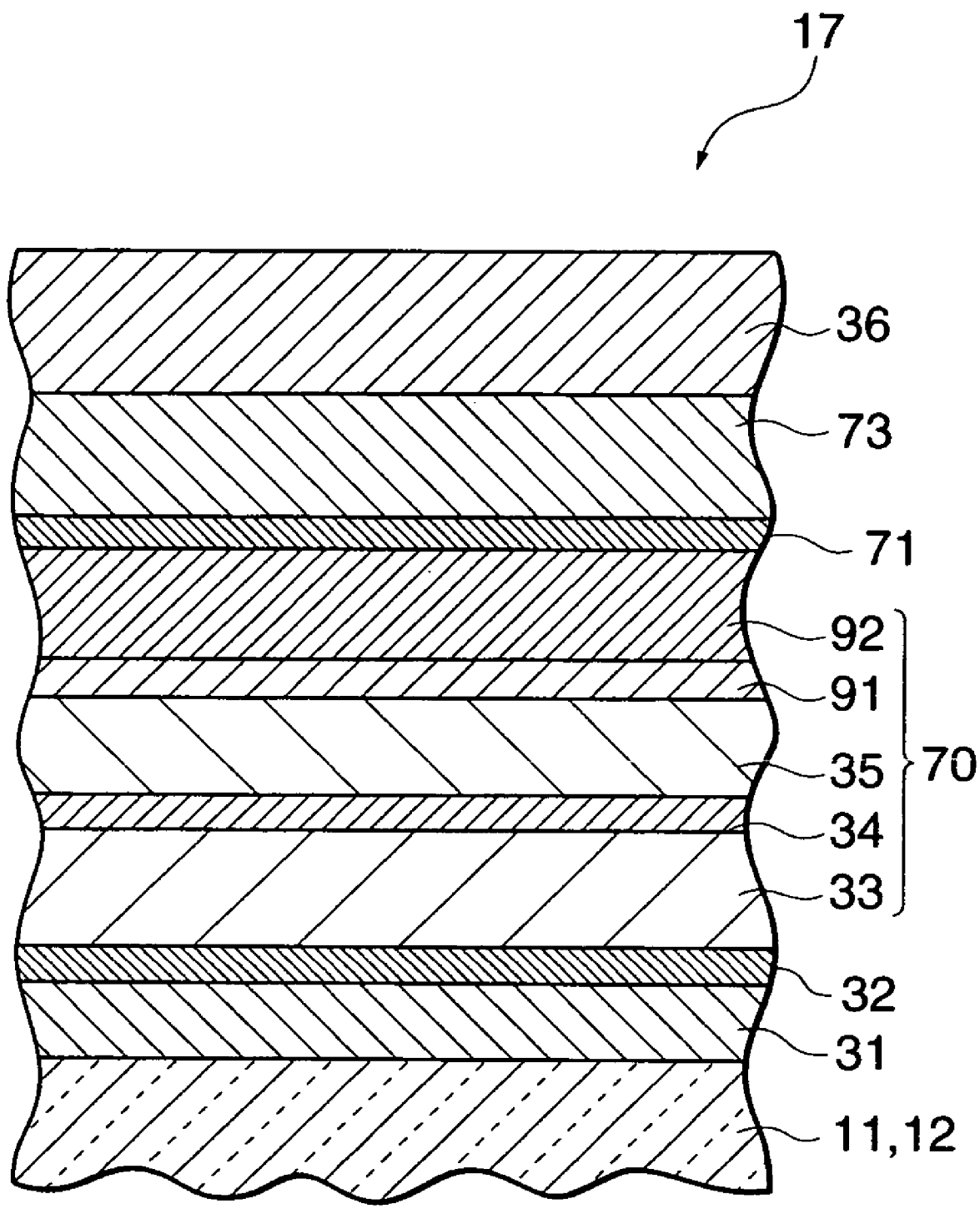
FIG. 10 is a sectional view showing a variation of the low-emission transparent multilayer in FIG. 9.

FIG. 10 is a sectional view showing a variation of the low-emission transparent multilayer in FIG. 9.

In FIG. 10, the low-emission transparent multilayer 17 is basically identical in construction with the low-emission transparent multilayer 17 in FIG. 9, but differs in that the TiOx layers 41 and 72 as sacrifice layers are not formed on the respective Ag—Pd layers 32 and 71 as a metal layer.

Figure 11:
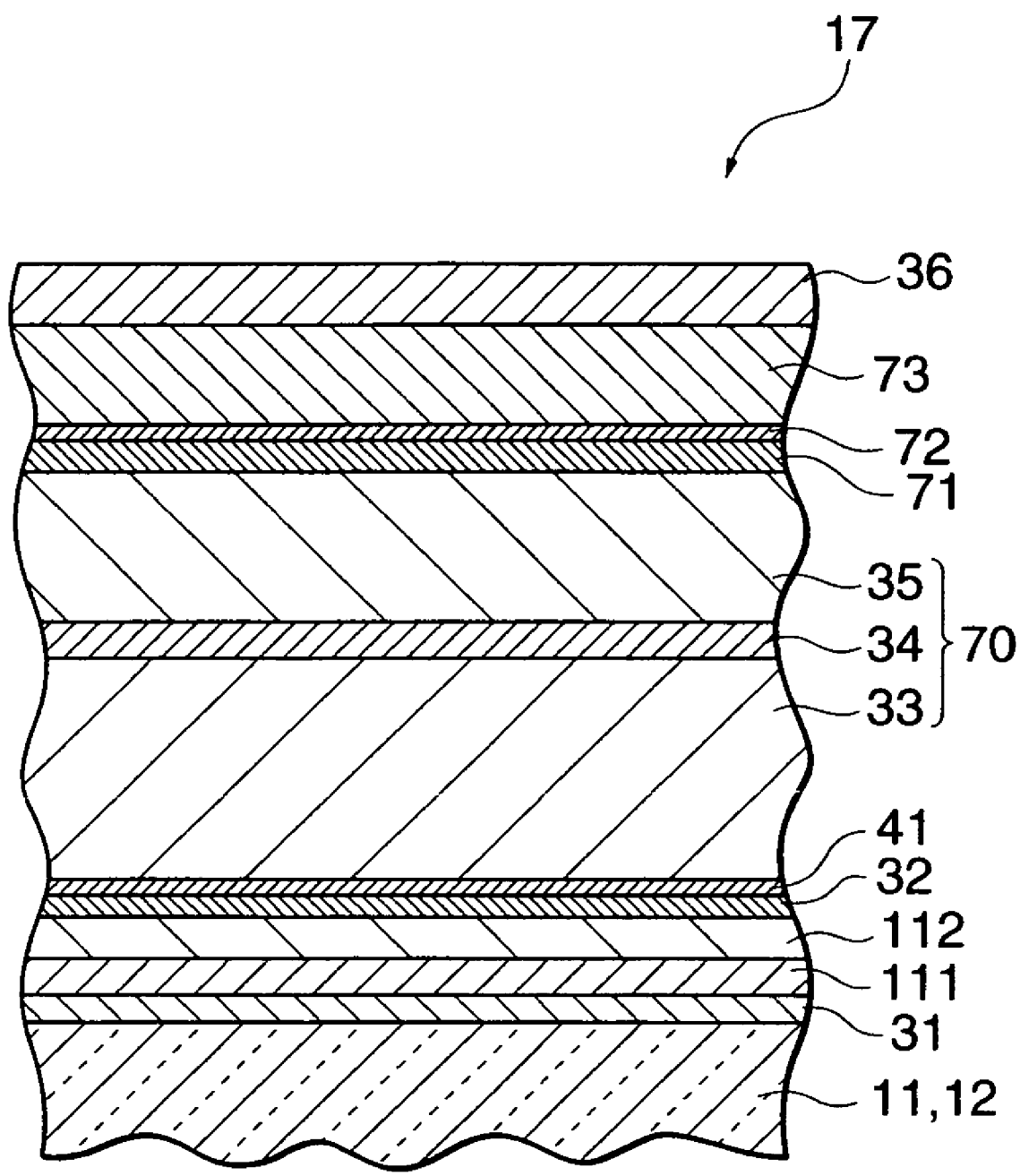
FIG. 11 is a sectional view showing a third variation of the low-emission transparent multilayer in FIG. 7.

FIG. 11 is a sectional view showing a third variation of the low-emission transparent multilayer in FIG. 7.

In FIG. 11, the low-emission transparent multilayer 17 is basically identical in construction with the low-emission transparent multilayer 17 in FIG. 7, but differs in that there are further provided an SiNx layer 111 as an amorphous layer formed on the ZnO layer 31, and a ZnO layer 112 as a dielectric layer that is formed on the SiNx layer 111 and yields a low degree of orientation of crystals.

Figure 12:
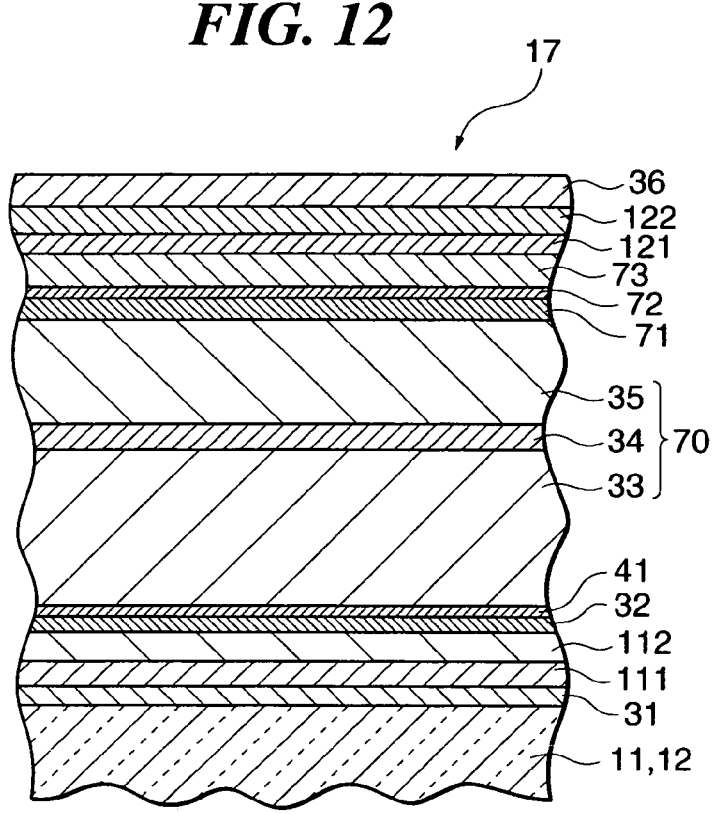
FIG. 12 is a sectional view showing a variation of the low-emission transparent multilayer in FIG. 11.

FIG. 12 is a sectional view showing a variation of the low-emission transparent multilayer in FIG. 11.

In FIG. 12, the low-emission transparent multilayer 17 is basically identical in construction with the low-emission transparent multilayer 17 in FIG. 11, but differs in that there are further provided an SiNx layer 121 as an amorphous layer formed on the ZnO layer 73 as a dielectric layer, and a ZnO layer 122 as a dielectric layer that is formed on the SiNx layer 121 and yields a low degree of orientation of crystals.

Although in the embodiment of the present invention, the ZnO layer 73 that is formed on the outer side of the Ag—Pd layer 71 of the low-emission transparent multilayer 17 in FIGS. 7, 9, and 11 is not one that yields a low degree of orientation of crystals, the ZnO layer 73 may be one that yields a low degree of orientation of crystals.

Although in the embodiment of the present invention, the SiNx layer 36 as a protective layer is formed as the uppermost layer of the low-emission transparent multilayer 17, there is no limitation thereto, but an $SiO_2$ layer may be provided on the SiNx layer 36. This can make smooth the surface of the uppermost layer of the low-emission transparent multilayer 17, so that in coating the paste-like sealing frame 13 on the low-emission transparent multilayer 17, generation of air bubbles between the low-emission transparent multilayer 17 and the sealing frame 13 can be suppressed, and during heating, the degree to which the air bubbles expand to cause entry of the sealing frame 13 into the hollow layer 14 can be controlled.

Although in the embodiment of the present invention, the ZnO layer 31 as a dielectric layer is formed on the glass plates 11 and 12, there is no limitation thereto, but an $SiO_2$ layer may be provided between the glass plates 11 and 12 and the ZnO layer 31 as a dielectric layer. This can improve adhesiveness of the low-emission transparent multilayer 17 and the corresponding surfaces of the glass plates 11 and 12 and therefore prevents exfoliation of the low-emission transparent multilayer from the surfaces of the glass plates 11 and 12.

Although in the embodiment of the present invention, the titanium layers (TiOx) are used as sacrifice layers, the present invention is not limited to this, but niobium layers (NbOx) may be used. The use of the niobium layers (NbOx) as sacrifice layers can improve visible light transmission and heat insulation performance and also makes it easier to control film thickness.

Figure 13:
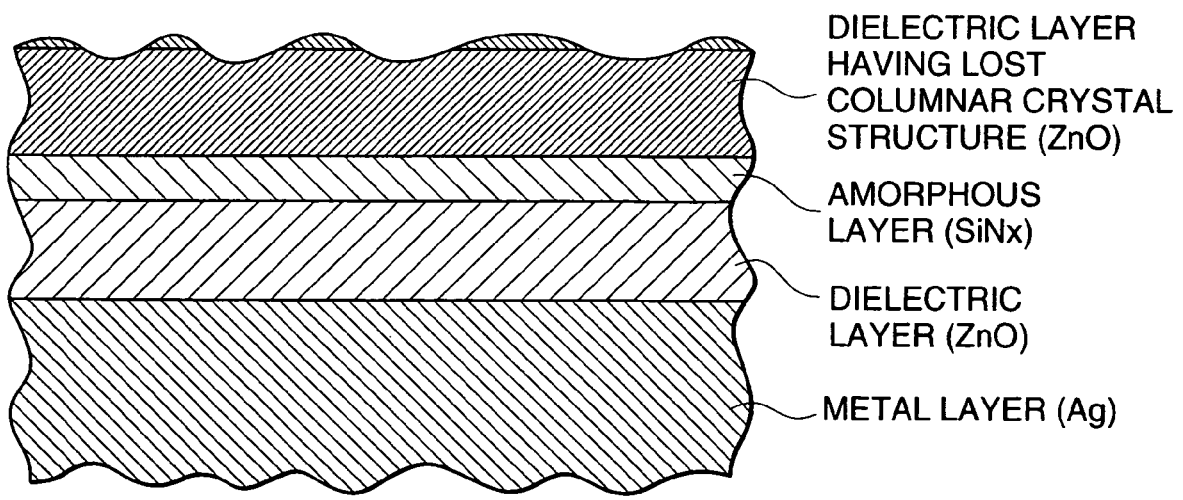
FIG. 13 is a schematic diagram showing dielectric layers separated from each other in the direction of film thickness by an amorphous layer.

The dielectric layer (ZnO) formed on the amorphous layer of the above described low-emission transparent multilayer 17 yields lost orientation of crystals as schematically illustrated in FIG. 13 and has improved surface smoothness.

Next, a concrete description will be given of examples and comparative examples of the present invention.

EXAMPLE 1

Figure 14:
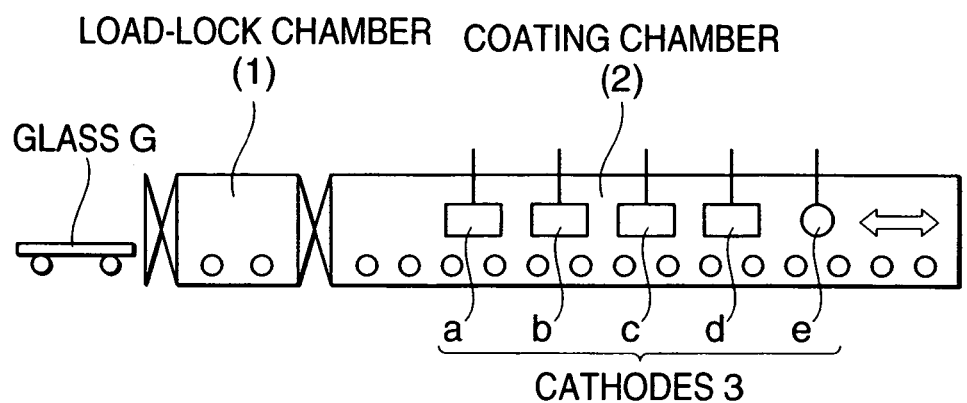
FIG. 14 is a schematic diagram showing a sputter device that is used to sputter the low-emission transparent multilayer.

A low-emission transparent multilayer having a construction as shown in FIG. 3, i.e. a dielectric/metal/dielectric sandwich structure comprised of ZnO/Ag—Pd/ZnO/SiNx/ZnO/SiNx was coated on one side surface of a sheet of typical float glass with 3 mm thickness×2500 mm×1800 mm using a so-called load-lock inline type magnetron sputter device having 5 sets of cathodes as shown in FIG. 14.

The coating was performed by transporting a cleaned glass plate (G) to a load-lock chamber (1) via the inlet of the magnetron sputter (coating) device as shown in FIG. 14, performing evacuation to a predetermined pressure, transporting the glass (G) to a coating chamber (2), and then introducing sputter gas into the coating chamber (2) and adjusting the pressure of the sputter gas to a predetermined pressure using an exhaust pump, and then applying electric power to cathodes (3) to produce electrical discharge, thereby sputtering the material set on each cathode.

Note that in this example, film coating of the glass was carried out at room temperature without particularly heating the glass, and the temperature of the film-coated glass was heated at not less than 500° C. and then reduced down to approximately room temperature at a temperature reducing speed of approximately 10 to 20° C./min so that the state in heat treatment during manufacture of a heat insulating and shielding glass panel could be re-created.

A detailed description will now be given of the coating.

First, a mixed gas in which an oxygen gas of 2% was added to an Ar gas was introduced into the coating chamber (2) such that the pressure of the mixed gas was made to be 0.40 Pa, and a direct current of 30 kW was applied to a cathode (3a) on which a zinc oxide sintered body target with tin (Sn) added thereto (size: 3100 mm×330 mm) was set so as to cause sputtering, and the glass was moved back and forth under the cathode (3a) to form a zinc oxide film with tin (Sn) added thereto as a first layer.

Next, the gas inside the coating chamber (2) was switched to Ar gas, and the pressure thereof was made to be 0.45 Pa, and a direct current of 14 kW was applied to a cathode (3c) on which a silver target with paradigm (Pd) added thereto (size: 3100 mm×330 mm) was set so as to cause sputtering, and the glass was moved under the cathode (3c), to thereby form a metal film as a second layer.

Thereafter, a zinc oxide film to which tin (Sn) added thereto was formed as a third layer using the same method as in the formation of the first layer.

Next, the gas inside the coating chamber (2) was switched to N₂ gas, and the pressure thereof was made to be 0.45 Pa, and a direct current of 50 kW was applied to a cathode (3e) on which a silicon target (size: 2900 mm×diameter of 150 mm) with aluminum of 10 wt % added thereto was set so as to cause reactive sputtering, and the glass was moved back and forth under the cathode (3e) to form a silicon nitride film with aluminum added thereto as a fourth layer. Thereafter, a zinc oxide film was formed as a fifth layer using the same method as in the formation of the first layer, and finally a silicon nitride film with aluminum added thereto was formed as a sixth layer using the same method as in the formation of the fourth layer. The thicknesses of the films were adjusted depending on the speed at which the glass was moved under the cathodes (3a, 3c, and 3e) and the number of times the glass was moved back and forth, such that the first layer was set to 10 nm, the second layer was set to 9 nm, the third layer was set to 26 nm, the fourth layer was set to 5 nm, the fifth layer was set to 9 nm, and the sixth layer was set to 7 nm.

EXAMPLE 2

A low-emission transparent multilayer having the same construction as in FIG. 6, i.e. a dielectric/metal/dielectric sandwich structure comprised of ZnO/Ag—Pd/TiOx/ZnO/SiNx/ZnO/SiNx/ZnO/SiNx was coated on one side surface of a sheet of the same float glass as in Example 1 using the same sputter device as in Example 1 in a manner described below.

First, oxygen gas was introduced into the coating chamber (2) such that the pressure of the oxygen gas was made to be 0.40 Pa, a direct current of 55 kW was applied to a cathode (3b) on which a zinc target (size: 3100 mm×330 mm) is set to cause reactive sputtering, and the glass was moved back and forth under the cathode (3b), to thereby form a zinc oxide film as a first layer. Next, the gas inside the coating chamber (2) was switched to Ar gas, the pressure thereof was made to be 0.45 Pa, and a direct current of 8 kW was applied to a cathode (3c) on which a silver target (size: 3100 mm×330 mm) with paradigm (Pd) added thereto was set, and at the same time a direct current of 8 kW was applied to a cathode (3d) on which a titanium target (size: 3100 mm×330 mm) was set, and the glass was moved back and forth under the cathodes (3c and 3d), thereby forming a metal film as a second layer and a titanium film as a third layer. Next, a zinc oxide film as a fourth layer was formed using the same method as in the formation of the first layer. When the oxide film as the fourth layer is formed, the titanium film as the third layer oxides itself, thereby serving as a so-called sacrifice layer that prevents degradation of silver in the metal film. Next, the gas inside the coating chamber (2) was switched to N₂ gas, the pressure thereof was made to be 0.45 Pa, and a direct current of 50 kW was applied to the cathode (3e) on which a silicon target (size: 2900 mm×diameter of 150 mm) with aluminum of 10 wt % added thereto was set so as to cause sputtering, and the glass was moved back and forth under the cathode (3e) to form a silicon nitride film with aluminum added thereto as a fifth layer. Thereafter, a zinc oxide film was formed as a sixth layer using the same method as in the formation of the first layer, a silicon nitride film with aluminum added thereto was formed as a seventh layer using the same method as in the formation of the fifth layer, a zinc oxide film was formed as a eighth layer using the same method as in the formation of the first layer, and finally a silicon nitride film with aluminum added thereto was formed as a ninth layer using the same method as in the formation of the fifth layer. The thicknesses of the films were adjusted depending on the speed at which the glass was moved under the cathodes (3c, 3d, and 3e) and the number of times the glass was moved back and forth, such that the first layer was set to 27 nm, the second layer was set to 13 nm, the third layer was set to 6 nm, the fourth layer was set to 8 nm, the fifth layer was set to 10 nm, the sixth layer was set to 13 nm, the seventh layer was set to 7 nm, the eighth layer was set to 9 nm, and the ninth layer was set to 7 nm.

EXAMPLE 3

A low-emission transparent multilayer having the same construction as in FIG. 7, i.e. a dielectric/metal /dielectric/metal/dielectric sandwich structure comprised of ZnO/Ag—Pd/TiOx/ZnO/SiNx/ZnO/Ag—Pd/TiOx/ZnO/SiNx was coated on a surface of one side of the same float glass as in Example 1 using the same sputter device as in Example 1 in a manner described below.

A zinc oxide film as a first layer, a metal film as a second layer, a titanium film as a third layer (which became a titanium oxide film after acting as a sacrifice layer), a zinc oxide film as a fourth layer, a silicon nitride film with aluminum added thereto as a fifth layer, and a zinc oxide film as a sixth layer were formed using the same method as in Example 2. Next, a metal film as a seventh layer and a titanium film as an eighth layer were formed using the same method as in the formation of the second and third layers, and a zinc oxide film as a ninth layer was formed using the same method as in the formation of the first layer (on this occasion, the titanium film as the eighth layer was oxidized as a sacrifice layer similarly to the third layer), and finally a silicon nitride film with aluminum added thereto as a tenth layer was formed using the same method in the formation of the fifth layer. The thicknesses of the films were adjusted depending on the speed at which the glass was moved under the cathodes and the number of times the glass was moved back and forth (electric power was additionally adjusted for only the seventh layer), such that the first layer was set to 13 nm, the second layer was set to 6 nm, the third layer was set to 3 nm, the fourth layer was set to 45 nm, the fifth layer was set to 6 nm, the sixth layer was set to 25 nm, the seventh layer was set to 13 nm, the eighth layer was set to 3 nm, the ninth layer was set to 22 nm, and the tenth layer was set to 8 nm.

EXAMPLE 4

A low-emission transparent multilayer having the same construction as in FIG. 9, i.e. a dielectric/metal/dielectric/metal/dielectric sandwich structure comprised of ZnO/Ag—Pd/TiOx/ZnO/SiNx/ZnO/SiNx/ZnO/Ag—Pd /TiOx/ZnO/SiNx was coated on a surface of one side of the same float glass as in Example 1 using the same sputter device as in Example 1 in a manner described below.

A zinc oxide film as a first layer, a metal film as a second layer, a titanium film as a third layer (which became a titanium oxide film after acting as a sacrifice layer), a zinc oxide film as a fourth layer, a silicon nitride film with aluminum added thereto as a fifth layer, and a zinc oxide film as a sixth layer were formed using the same method as in Example 2. Next, a silicon nitride film with aluminum added thereto as a seventh layer and a zinc oxide film as an eighth layer were formed using the same method as in the formation of the fifth and sixth layers, and a metal film as a ninth layer, a titanium layer as a tenth layer, a zinc oxide film as an eleventh layer(on this occasion, the titanium film as the tenth layer was similarly oxidized as a sacrifice layer), a silicon nitride film with aluminum added thereto as a twelfth layer were then formed using the same method as in the formation of the second, third, fourth, and fifth layers. The thicknesses of the films were adjusted depending on the speed at which the glass was moved under the cathodes and the number of times the glass was moved back and forth (power was additionally adjusted for only the ninth layer), such that the first layer was set to 19 nm, the second layer was set to 6 nm, the third layer was set to 3 nm, the fourth layer was set to 16 nm, the fifth layer was set to 13 nm, the sixth layer was set to 17 nm, the seventh layer was set to 14 nm, the eighth layer was set to 18 nm, the ninth layer was set to 13 nm, the tenth layer was set to 3 nm, the eleventh layer was set to 11 nm, and the twelfth layer was set to 19 nm.

EXAMPLE 5

A low-emission transparent multilayer having the same construction as in FIG. 11, i.e. a dielectric/metal/dielectric/metal/dielectric sandwich structure comprised of ZnO/SiNx/ZnO/Ag—Pd/TiOx/ZnO/SiNx/ZnO/Ag—Pd/TiOx/ZnO/SiNx was coated on a surface of one side of the same float glass as in Example 1 using the same sputter device as in Example 1 in a manner described below.

A zinc oxide film as a first layer, a silicon nitride film with aluminum added thereto as a second layer, a zinc oxide film as a third layer, a metal film as a fourth layer, a titanium film as a fifth layer (which became a titanium oxide film after acting as a sacrifice layer), a zinc oxide film as a sixth layer, a silicon nitride film with aluminum added thereto as a seventh layer, and a zinc oxide film as an eighth layer were formed.

Next, using the same method as in the formation of the fourth, fifth, and sixth layers, a metal film as a ninth layer, a titanium film as a tenth layer, and a zinc oxide film as an eleventh layer were formed (on this occasion, the titanium film as the tenth layer was similarly oxidized as a sacrifice layer), and finally a silicon nitride film with aluminum added thereto as a twelfth layer was formed.

The thicknesses of the films were adjusted depending on the speed at which the glass was moved under the cathodes and the number of times the glass was moved back and forth (power was additionally adjusted for only the ninth layer), such that the first layer was set to 4 nm, the second layer was set to 5 nm, the third layer was set to 4 nm, the fourth layer was set to 6 nm, the fifth layer was set to 3 nm, the sixth layer was set to 45 nm, the seventh layer was set to 6 nm, the eighth layer was set to 25 nm, the ninth layer was set to 13 nm, the tenth layer was set to 3 nm, the eleventh layer was set to 22 nm, and the twelfth layer was set to 8 nm.

EXAMPLE 6

A low-emission transparent multilayer having the same construction as in FIG. 12, i.e. a dielectric/metal/dielectric/metal/dielectric sandwich structure comprised of ZnO/SiNx/ZnO/Ag—Pd/TiOx/ZnO/SiNx/ZnO/Ag—Pd /TiOx/ZnO/SiNx/ZnO/SiNx was coated on a surface of one side of the same float glass as in Example 1 using the same sputter device as in Example 1 in a manner described below.

A zinc oxide film as a first layer, a silicon nitride film with aluminum added thereto as a second layer, a zinc oxide film as a third layer, a metal film as a fourth layer, a titanium film as a fifth layer (which became a titanium oxide film after acting as a sacrifice layer), a zinc oxide film as a sixth layer, a silicon nitride film with aluminum added thereto as a seventh layer, and a zinc oxide film as an eighth layer were formed using the same method as in Example 5.

Next, a metal film as a ninth layer, a titanium film as a tenth layer, and a zinc oxide film as an eleventh layer were formed (on this occasion, the titanium film as the tenth layer was similarly oxidized as a sacrifice layer), a silicon nitride film with aluminum added thereto as a twelfth layer, and a zinc oxide film as a thirteenth layer were formed using the same method as in the formation of the fourth, fifth, sixth, seventh, and eighth layers, and finally silicon nitride with aluminum added thereto as a fourteenth layer was formed.

The thicknesses of the films were adjusted depending on the speed at which the glass was moved under the cathodes and the number of times the glass was moved back and forth (power was additionally adjusted for only the ninth layer), such that the first layer was set to 4 nm, the second layer was set to 5 nm, the third layer was set to 4 nm, the fourth layer was set to 6 nm, the fifth layer was set to 3 nm, the sixth layer was set to 45 nm, the seventh layer was set to 6 nm, the eighth layer was set to 25 nm, the ninth layer was set to 13 nm, the tenth layer was set to 3 nm, the eleventh layer was set to 10 nm, the twelfth layer was set to 5 nm, the thirteenth layer was set to 7 nm, and the fourteenth layer was set to 8 nm.

COMPARATIVE EXAMPLE 1

A low-emission transparent multilayer having a dielectric/silver/dielectric/silver/dielectric sandwich structure comprised of ZnO/Ag/TiOx/ZnO/Ag/TiOx/ZnO/SiNx was coated on a surface of one side of the same float glass as in Example 1 using the same sputter device as in Example 1 in a manner described below.

A zinc oxide film as a first layer, a silver film as a second layer, a titanium film as a third layer (which became a titanium oxide film after acting as a sacrifice layer), and a zinc oxide film as a fourth layer were formed using the same method as in Example 3. Next, a silver film as a fifth layer, a titanium film as a sixth layer, and a zinc oxide film as a seventh layer were formed (on this occasion, the titanium film as the sixth layer was similarly oxidized as a sacrifice layer) using the same method as in the formation of the second, third, and fourth layers. Finally, a silicon nitride film with aluminum added thereto as an eighth layer was formed using the same method as in the formation of the ninth layer in Example 2.

The thicknesses of the films were adjusted depending on the speed at which the glass was moved under the cathodes and the number of times the glass was moved back and forth (electric power was additionally adjusted for only the ninth layer), such that the first layer was set to 16 nm, the second layer was set to 6 nm, the third layer was set to 3 nm, the fourth layer was set to 74 nm, the fifth layer was set to 13 nm, the sixth layer was set to 3 nm, the seventh layer was set to 19 nm, and the eighth layer was set to 9 nm.

COMPARATIVE EXAMPLE 2

A low-emission transparent multilayer having a dielectric/silver/dielectric/silver/dielectric sandwich structure comprised of Zno/Ag/TiOx/ZnO/Ag/TiOx/ZnO/SiNx was coated on a surface of one side of the same float glass as in Comparative Example 1 using the same sputter device as in Comparative Example 1 in a manner described below.

A zinc oxide film as a first layer, a silver film as a second layer, a titanium film as a third layer (which became a titanium oxide film after acting as a sacrifice layer), a zinc oxide film as a fourth layer, a silver film as a fifth layer, a titanium film as a sixth layer, a zinc oxide film as a seventh layer (on this occasion, the titanium film as the sixth layer was similarly oxidized as a sacrifice layer), and a silicon nitride film with aluminum added thereto as an eighth layer were formed using the same method as in Comparative Example 1. The zinc oxide films as the first, fourth, and seventh layers, however, were formed by reactive sputtering at a gas pressure of 0.40 Pa using a mixed gas with a nitrogen-to-oxygen ratio of 1:1 for the purpose of reducing the average crystal grain size.

In the multilayer thus obtained, unevenness in reflected color and transmitted color developed in the direction of the float glass in the direction of the length of 2500 mm, raising a problem in terms of evenness.

COMPARATIVE EXAMPLE 3

A low-emission transparent multilayer having a dielectric/silver/dielectric/silver/dielectric sandwich structure comprised of ZnO/Ag/TiOx/ZnO/Ag/TiOx/ZnO/SiNx was coated on a surface of one side of the same float glass as in Comparative Example 1 using the same sputter device as in Comparative Example 1 in a manner described below.

A zinc oxide film as a first layer, a silver film as a second layer, a titanium film as a third layer (which became a titanium oxide film after acting as a sacrifice layer), a zinc oxide film as a fourth layer, a silver film as a fifth layer, a titanium film as a sixth layer, a zinc oxide film as a seventh layer (on this occasion, the titanium film as the sixth layer was similarly oxidized as a sacrifice layer), and a silicon nitride film with aluminum added thereto as an eighth layer were formed using the same method as in Comparative Example 1. The zinc oxide films as the first, fourth, and seventh layers, however, were formed by reactive sputtering at an increased oxygen gas pressure of 1.0 Pa for the purpose of reducing the average crystal grain size. The movement of glass, however, changed conductance inside the vacuum chamber and made gas pressure unstable.

In the multilayer thus obtained, unevenness in reflected color and transmitted color developed in the direction of the float glass in the direction of the length of 1800 mm, raising a problem in terms of evenness.

CHARACTERISTIC EVALUATION

The multilayer thus obtained demonstrated satisfactory characteristics as a low-emission transparent multilayer because it had an emittance of 0.090 in Example 1, 0.057 in Example 2, 0.035 in Example 3, 0.030 in Example 4, 0.028 in Example 5, 0.026 in Example 6, and 0.040 in Comparative Example 1, and had a visible light transmittance of 83.0% in Example 1, 74.1% in Example 2, 78.1% in Example 3, 78.4% in Example 4, 78.6% in Example 5, 78.7% in Example 6, and 77.5% in Comparative Example 1.

Also, the multilayer had an integral width βi of 0.58 in Example 1, 0.76 in the Example 2, 0.56 in Example 3, 0.98 in Example 4, 0.63 in Example 5, 0.68 in the Example 6, and 0.28 in Comparative Example 1.

The results of characteristic evaluation of the Examples 1 to 6 and Comparative example 1 are shown below in Table 1.

TABLE 1

| | | Example | | | | | | Comparative |
|---|---|---|---|---|---|---|---|---|
| | | 1 | 2 | 3 | 4 | 5 | 6 | Example 1 |
| Film Composition and Film Thickness (nm) | SiNx | 7 | 7 | 8 | 19 | 8 | 8 | 9 |
| | ZnO | — | 9 | — | — | — | 7 | — |
| | SiNx | — | — | — | — | — | 5 | — |
| | ZnO | — | — | 22 | 11 | 22 | 10 | 19 |
| | TiOx | — | — | 3 | 3 | 3 | 3 | 3 |
| | Ag—Pd (Ag) | — | — | 13 | 13 | 13 | 13 | 13 |
| | ZnO | — | — | — | 18 | — | — | — |

TABLE 1-continued

| | | Example 1 | Example 2 | Example 3 | Example 4 | Example 5 | Example 6 | Comparative Example 1 |
|---|---|---|---|---|---|---|---|---|
| | SiNx | — | 7 | — | 14 | — | — | — |
| | ZnO | 9 | 13 | 25 | 17 | 25 | 25 | — |
| | SiNx | 5 | 10 | 6 | 13 | 6 | 6 | — |
| | ZnO | 26 | 8 | 45 | 16 | 45 | 45 | 74 |
| | TiOx | — | 6 | 3 | 3 | 3 | 3 | 3 |
| | Ag—Pd (Ag) | 9 | 13 | 6 | 6 | 6 | 6 | 6 |
| | ZnO | — | — | — | — | 4 | 4 | — |
| | SiNx | — | — | — | — | 5 | 5 | — |
| | ZnO | 10 | 27 | 13 | 19 | 4 | 4 | 16 |
| | Glass | FL3 | FL3 | FL3 | FL3 | FL3 | FL3 | FL3 |
| Associated Drawings Characteristics | Drawings in Specification | FIG. 3 | FIG. 6 | FIG. 7 | FIG. 9 | FIG. 11 | FIG. 12 | — |
| | Emittance | 0.090 | 0.057 | 0.035 | 0.030 | 0.028 | 0.026 | 0.040 |
| | Visible Light Transmission (%) | 83.0 | 74.1 | 78.1 | 78.4 | 78.6 | 78.7 | 77.5 |
| | βi | 0.58 | 0.76 | 0.56 | 0.98 | 0.63 | 0.68 | 0.28 |
| | Saltwater Immersion Test | ○ | ○ | ○ | ○ | ○ | ○ | X |
| | Peel-off Breakage Load (mN) | — | — | 26 | — | — | — | 13 |
| | Heat Insulation Performance (Amount of Ag Flocculation) | Δ | ○ | Δ | Δ | Δ | Δ | X |

Figure 15:
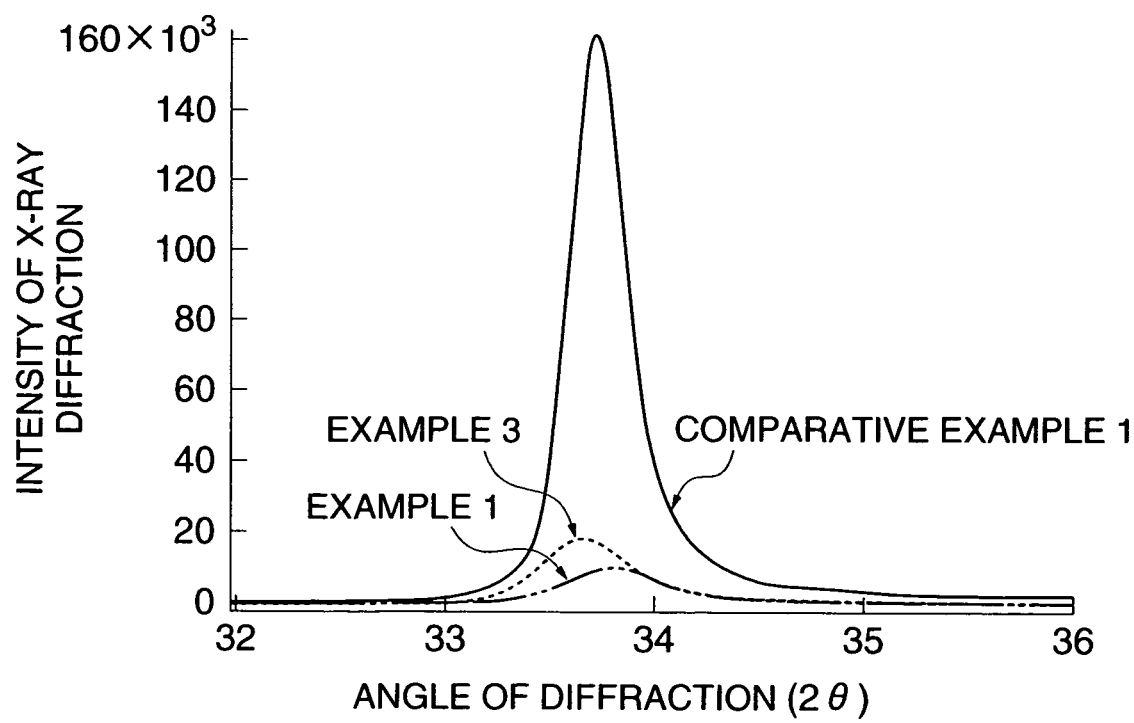
FIG. 15 is an X-ray diffraction graph showing the orientation of crystals.

XRD analysis of the coatings (multilayers) was carried out using a CuKα ray by a θ–2θ method, and it was found that a peak presumed to be based on a (002) diffraction ray of zinc oxide appeared at 2θ=32 to 35° with respect to all the coatings. This raw data is illustrated in FIG. 15 with respect to Examples 1 and 3 and Comparative Example 1. With respect to such diffraction peaks, separation of Kα1 and Kα2 and correction of peak positions and peak widths using a standard sample were carried out to calculate integral widths (βi), and the integral widths in Examples 1, 3, and 4, and Comparative Example 1 were 0.58, 0.56, and 0.98 in Examples 1, 3, and 4, respectively, and 0.28 in Comparative Example 1.

A saltwater immersion test (an aqueous solution containing NaCl of 3 wt %, 20° C.) was conducted so as to check the chemical durability of the coatings, and it was found that there was no change in the coatings of Examples 1 to 3 after immersion for three hours, whereas pinhole-like reflection Luminescent spots were found in the coating of Comparative Example 1 under intense light. This showed that the coatings of Examples 1, 2, and 3 had high chemical durability.

A scratch test using a diamond indenter whose tip has a radius of 5 μm was conducted using a CSR-02 scratch tester produced by Rhesca Co., Ltd. so as to check the scratch resistance of the coatings, and it was found that the load at which peel-off breakage of the coatings started was 26 mN in Example 3, but 13 mN in Comparative Example 1. This showed that the coatings of Examples 1, 2, and 3 had high scratch resistance.

The amount of flocculation of Ag was visually observed so as to check the heat resistance of the coatings, and it was found that the amount of flocculation of Ag was large and the appearance was degraded in Comparative Example 1, but was not so large in Examples; particularly in Example 2, there was not much flocculation of Ag. This showed that even if the coatings were brought into a smoking or smoldering state by heat treatment, the degree to which the coatings of Examples, particularly Example 2 was deteriorated was small, i.e. heat insulation performance was high.

INDUSTRIAL APPLICABILITY

According to the present invention, dielectric layers are separated from one another in the direction of film thickness by amorphous layers, and metal layers contain Ag and Pd; as a result, the durability of the metal layers can be improved, and hence even if heat treatment is carried out during manufacturing, heat shield performance can be maintained.

According to the present invention, a low-emission transparent multilayer includes an $SiO_2$ layer as the uppermost layer in contact with a hollow layer and an outer peripheral sealing portion; as a result, it is possible to suppress generation of air bubbles between the low-emission transparent multilayer and the outer peripheral sealing portion when coating the outer peripheral sealing portion onto the low-emission transparent multilayer and to control the degree to which the outer peripheral sealing portion enters the hollow layer.

According to the present invention, the low-emission transparent multilayer includes an $SiO_2$ layer as the lowermost layer in contact with the glass plate surface; as a result, the adhesiveness of the low-emission transparent multilayer and the glass plate surface can be improved, and hence separation of the low-emission transparent multilayer from the glass plate surface can be prevented.

According to the present invention, the dielectric layers have zinc oxide as a principal component thereof; as a result, entry of moisture and gas from the outside to the low-emission transparent multilayer can be prevented, and hence the durability of the low-emission transparent multilayer can be improved.

According to the present invention, at least one of the dielectric layers is located on the opposite side of the glass plate relative to the metal layer closest to the glass plate; as a result, entry of moisture and gas from the outside into the metal layers can be prevented, and hence the durability of the low-emission transparent multilayer can be improved.

According to the present invention, the outermost layer of the low-emission transparent multilayer is a protective layer comprised of a nitride, an oxynitride, or an amorphous oxide containing at least one kind of metal selected from a group of Si, Al, Ti, and Sn; as a result, the durability of the low-emission transparent multilayer can be further improved.

According to the present invention, at least one of the amorphous layers is comprised of silicon nitride; as a result, the durability and abrasion resistance of the low-emission transparent multilayer as well as the heat insulation performance of the glass panel can be improved.

According to the present invention, a sacrifice layer is comprised of an oxide containing Nb; as a result, visible light transmittance and heat insulation performance can be improved, and film thickness can be easily controlled.

According to the present invention, the low-emission transparent multilayer is comprised of a first dielectric layer, a metal layer, a sacrifice layer, a second dielectric layer, a first amorphous layer, a third dielectric layer, a second amorphous layer, a fourth dielectric layer, and a third amorphous layer; as a result, the heat insulation performance of the low-emission transparent multilayer can be maintained even if it is brought into a smoking or smoldering state by heat treatment.

According to the present invention, the first dielectric layer, the metal layer, the sacrifice layer, the second dielectric layer, the first amorphous layer, the third dielectric layer, the second amorphous layer, the fourth dielectric layer, and the third amorphous layer have film thicknesses of 25 to 30 nm, 10 to 20 nm, 1 to 10 nm, 1 to 20 nm, 1 to 20 nm, 1 to 20 nm, 1 to 20 nm, 1 to 20 nm, and 1 to 20 nm, respectively; as a result, the heat insulation performance of the low-emission transparent multilayer can be reliably maintained even if it is brought into a smoking or smoldering state by heat treatment.

The invention claimed is:

1. A heat insulating and shielding glass panel comprising a pair of glass plates provided separated from each other via pillars by a predetermined gap so as to form a hollow layer therebetween, and an outer peripheral sealing portion that hermetically seals the hollow layer at a peripheral portion of said pair of glass plates,
   wherein a low-emission transparent multilayer is formed on a glass plate surface facing the hollow layer, the low-emission transparent multilayer comprising:
   a first dielectric layer formed on the glass plate surface;
   a metal layer containing Ag and Pd and formed on the first dielectric layer;
   a sacrifice layer formed on the metal layer for preventing degradation of the metal layer during formation thereof;
   a second dielectric layer formed on the sacrifice layer;
   a first amorphous layer formed on the second dielectric layer;
   a third dielectric layer formed on the first amorphous layer;
   a second amorphous layer formed on the third dielectric layer;
   a fourth dielectric layer formed on the second amorphous layer; and
   a third amorphous layer formed directly on the fourth dielectric layer.

2. A heat insulating and shielding glass panel as claimed in claim 1, wherein the low-emission transparent multilayer comprises an SiO$_2$ layer as an uppermost layer in contact with the hollow layer and said outer peripheral sealing portion.

3. A heat insulating and shielding glass panel as claimed in claim 1, wherein the low-emission transparent multilayer comprises an SiO$_2$ layer as a lowermost layer in contact with the glass plate surface.

4. A heat insulating and shielding glass panel as claimed in claim 1, wherein each of the dielectric layers comprises an oxide layer containing at least one kind of metal selected from a group of Zn, Sn, Ti, In, and Bi.

5. A heat insulating and shielding glass panel as claimed in claim 4, wherein each of the dielectric layers comprises zinc oxide as a principal component thereof.

6. A heat insulating and shielding glass panel as claimed in claim 1, wherein each of the amorphous layers comprises at least one selected from a group of a nitride, an oxynitride, and an amorphous oxide.

7. A heat insulating and shielding glass panel as claimed in claim 6, wherein the nitride layer comprises a nitride containing at least one kind of metal selected from a group of Si, Al, Ti, and Sn.

8. A heat insulating and shielding glass panel as claimed in claim 6, wherein the oxynitride layer comprises an oxynitride containing at least one kind of metal selected from a group of Si, Al, Ti, and Sn.

9. A heat insulating and shielding glass panel as claimed in claim 6, wherein the amorphous oxide layer comprises an amorphous oxide containing at least one kind of metal selected from a group of Si, Al, Ti, and Sn.

10. A heat insulating and shielding glass panel as claimed in claim 1, wherein an uppermost layer of the low-emission transparent multilayer, the uppermost layer being in contact with the hollow layer and said outer peripheral sealing portion, is implemented by a protective layer comprising a nitride, an oxynitride, or an amorphous oxide containing at least one kind of metal selected from a group of Si, Al, Ti, and Sn.

11. A heat insulating and shielding glass panel as claimed in claim 1, wherein each of the amorphous layers has a film thickness of not less than 3 nm and not more than 30 nm.

12. A heat insulating and shielding glass panel as claimed in claim 11, wherein each of the amorphous layers has a film thickness of not less than 5 nm and not more than 20 nm.

13. A heat insulating and shielding glass panel as claimed in claim 1, wherein at least one of the amorphous layers comprises silicon nitride.

14. A heat insulating and shielding glass panel as claimed in claim 1, wherein each of the dielectric layers has zinc oxide as a principal component thereof.

15. A heat insulating and shielding glass panel as claimed in claim 1, wherein the sacrifice layer comprises an oxide containing Ti.

16. A heat insulating and shielding glass panel as claimed in claim 1, wherein the sacrifice layer comprises an oxide containing Nb.

17. A heat insulating and shielding glass panel as claimed in claim 1, wherein the metal layers have Ag as a principal component thereof.

18. A heat insulating and shielding glass panel as claimed in claim 1, wherein the low-emission transparent multilayer is configured such that an integral width βi of a peak whose maximum lies at $32° \leq 2\theta$ (angle of diffraction) $\leq 35°$ among X-ray diffraction peaks obtained using a CuKα ray is not less than 0.43 and not more than 1.20.

19. A heat insulating and shielding glass panel as claimed in claim 18, wherein the integral width βi is not less than 0.50 and not more than 1.20.

20. A heat insulating and shielding glass panel as claimed in claim 18, wherein the peak whose maximum lies at 32°≦2θ (angle of diffraction) ≦35° is a peak based on a (002) diffraction ray of zinc oxide.

21. A heat insulating and shielding glass panel as claimed in claim 1, wherein the first dielectric layer, the metal layer, the sacrifice layer, the second dielectric layer, the first amorphous layer, the third dielectric layer, the second amorphous layer, the fourth dielectric layer, and the third amorphous layer have film thicknesses of 25 to 30 nm, 10 to 20 nm, 1 to 1.0 nm, 1 to 20 nm, 1 to 20 nm, 1 to 20 nm, 1 to 20 nm, 1 to 20 nm, and 1 to 20 nm, respectively.

* * * * *